(12) United States Patent
Nakano et al.

(10) Patent No.: US 7,908,245 B2
(45) Date of Patent: Mar. 15, 2011

(54) DATABASE MANAGEMENT METHOD AND DATABASE MANAGEMENT APPARATUS

(75) Inventors: Yoshihisa Nakano, Kawasaki (JP); Takayuki Nakazawa, Kawasaki (JP); Naohiro Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 12/039,443

(22) Filed: Feb. 28, 2008

(65) Prior Publication Data

US 2008/0222209 A1    Sep. 11, 2008

(30) Foreign Application Priority Data

Mar. 9, 2007  (JP) ................................. 2007-060898

(51) Int. Cl.
    *G06F 7/00*   (2006.01)
(52) U.S. Cl. ......................... 707/607; 707/703; 707/826
(58) Field of Classification Search .................. 707/607, 707/703, 826
    See application file for complete search history.

(56) References Cited

U.S. PATENT DOCUMENTS

| | | | | |
|---|---|---|---|---|
| 7,284,018 B1 * | 10/2007 | Waldorf et al. | ............... | 707/607 |
| 7,689,565 B1 * | 3/2010 | Gandhi et al. | ............ | 707/999.01 |
| 2007/0067334 A1 * | 3/2007 | Durbin | .......................... | 707/102 |

FOREIGN PATENT DOCUMENTS

JP    A 11-212831    8/1999

OTHER PUBLICATIONS

Lomet et al., SIGMOD 2006, Jun. 27-29, 2006, Chicago, Illinois, USA, pp. 337-346.*
Lane, T., Transaction Processing in PostgreSQL, Great Bridge, LLC, pp. 1-22, 2000.*
Plattner et al., SIGMOD 2006, Jun. 17-29, 2006, Chicago, Illinois, USA, pp. 754-756.*
Conway et al., http://neilconway.org/docs/slony2_report.pdf, Jan. 12, 2006, pp. 1-23.*

* cited by examiner

*Primary Examiner* — Cheyne D Ly
(74) *Attorney, Agent, or Firm* — Greer, Burns & Crain, Ltd.

(57) ABSTRACT

Database management involving obtaining a request of update of a record of a database including: (i) pages with records, each including data and transaction identification information (XID) that has a range that is divided by a predetermined range; and (ii) generation identification information (GID) that is increased when the XID's value exceeds the divided range, where the page includes a GID header indicating the earliest GID of the records of the page. Also, reading a page's GID header when switching pages, comparing the GID header with the present GID of the present XID, and performing a freeze process to the record having the XID included in the page's GID header when the GID header's value is less than the difference between the GID's value to which the present XID belongs and a predetermined value.

7 Claims, 11 Drawing Sheets

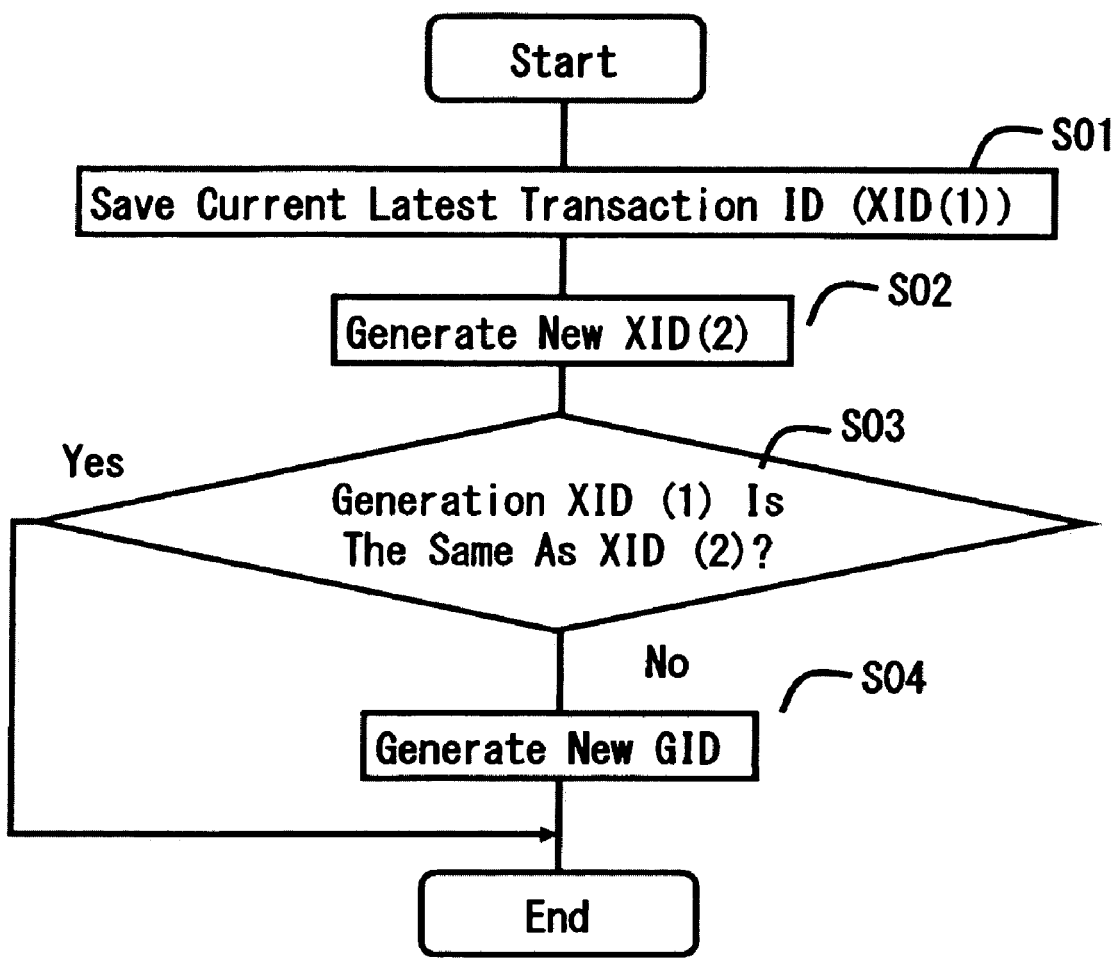

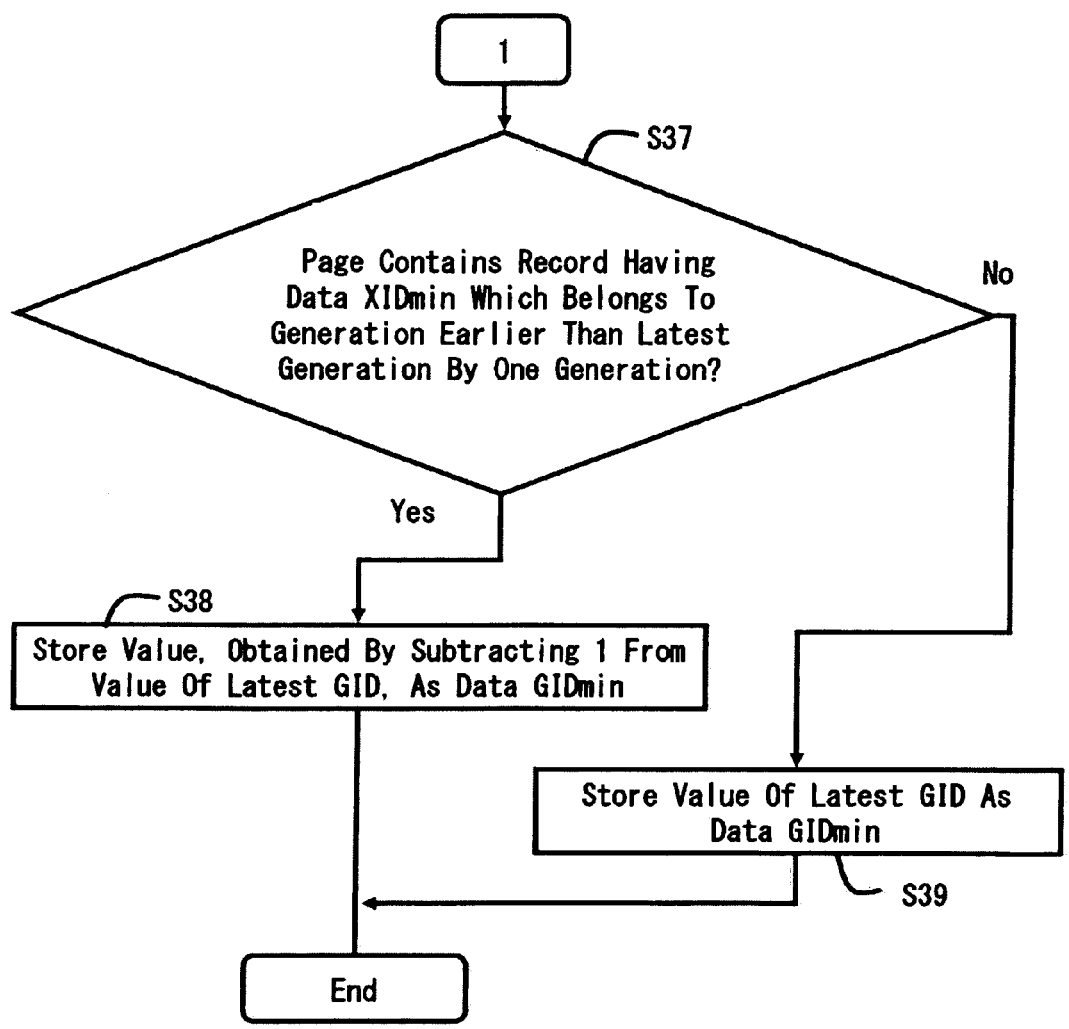

DATABASE MANAGEMENT METHOD AND DATABASE MANAGEMENT APPARATUS

TECHNICAL FIELD

This art relates to a method for managing a plurality of records of the database in an information processing apparatus by using transactions.

PostgreSQL is one of the standard of the database management systems. According to the PostgreSQL, the plurality of records have transaction IDs, respectively. The transaction ID is iteratively used transaction address numbers. The information processing apparatus enables to a roll back process by using the transaction IDs. If transaction ID return to an initial value, the information processing apparatus does not perform the roll back process correctly. In PostgreSQL, the information processing apparatus changes a transaction ID into a FROZEN TRANSACTION ID. The FROZEN TRANSACTION ID is older than transaction ID being available to the roll back process. This changing process is called "VACUUM".

The information processing apparatus executes the VACUUM process all of the database. The execution of the VACUUM processes are a large load in the database system.

For example, a related art is known by Japanese Laid-open Patent Publication No. 11-212831.

SUMMARY

An object of the present invention is to provide a database management method for distributing a load caused by organization of transaction IDs in a database.

According to an aspect of an embodiment, a method for managing a database for records of transactions, each of the transaction specifying an order of processing, and being associated with a value related to generation of the transaction, said database comprising a plurality of page data containing a plurality of records, each of the records comprising data and information indicative of the value of one of said transactions, the method comprising the steps of: reading out one of said page data containing a target record of request of a transaction associated with the target record from said database; evaluating each value associated with the transactions in the page data; and invaliding the record associated with a value greater than a predetermined value.

BRIEF DESCRIPTION OF THE DRAWINGS

FIG. 5 is a flowchart of an operation of acquiring identification numbers XID and GID;

FIG. 8A and FIG. 8B are flowcharts of a FREEZE process performed on data XIDmin 29;

DESCRIPTION OF THE PREFERRED EMBODIMENTS

An embodiment of the present invention will be described in detail below.

Figure 1:
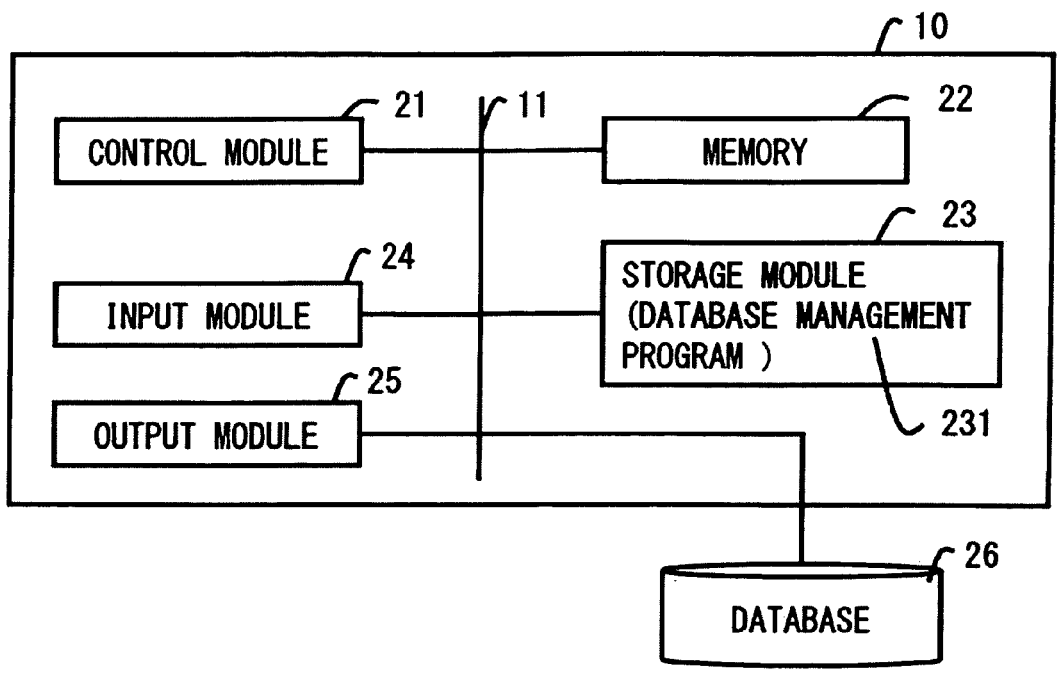
FIG. 1 is a diagram illustrating hardware configuration according to an embodiment.

FIG. 1 is a diagram illustrating hardware configuration of a database management system in accordance with the present embodiment.

A database management apparatus 10 includes a control module 21, a memory 22, a storage module 23, an input module 24, and an output module 25 which are connected to a bus 11.

The control module 21 controls the whole of the database management apparatus 10 and includes, for example, a central processing unit (CPU). The control module 21 executes a database management program 231 developed in the memory 22. The database management program 231 allows the control module 21 to function as an input module that acquires new data and a command, a detection module that detects a target record, a comparison module that compares the values of transaction IDs in a page, and an output module that outputs an updated page.

The memory 22 serves as a storage area where the database management program 231 stored in the storage module 23 is developed. The memory 22 further functions as a storage area for storing various operation results generated during execution of the database management program 231 by the control module 21. For example, a page read from a database and DIRTY data to be reflected as a result of updating the contents of the read page in the database are temporarily stored in the memory 22. The memory 22 includes, for example, a random access memory (RAM).

The input module 24 receives instruction information from another user. The input module 24 includes, for example, a keyboard, a mouse, and/or a touch panel. The output module 25 outputs a result of processing. The output module 25 includes, for example, a display. The storage module 23 stores the database management program 231. The storage module 23 includes, for example, a hard disk.

A database 26 is an object to be managed by the database management apparatus 10. In the present embodiment, it is assumed that PostgreSQL is used for database management. According to PostgreSQL, the database management apparatus 10 performs processing for each transaction on the database to store data into the database.

When the database management apparatus 10 processes of retrieving data from the database or updating data stored in the database, whether the data is previous data for a transaction to execute the process is determined by comparing the value of an identification number (hereinafter, referred to as "XID") used for identifying a transaction related to the data stored in a record with the value of an XID assigned to the transaction currently in progress.

In PostgreSQL in accordance with the present embodiment, for example, each XID is implemented as a 4-byte unsigned integer. When an XID has a value exceeding the range of 4-byte unsigned integers, the XIDs returns to an initial value. the database management apparatus 10 does not perform correctly while the overflow of XIDs is remained.

Figure 2:
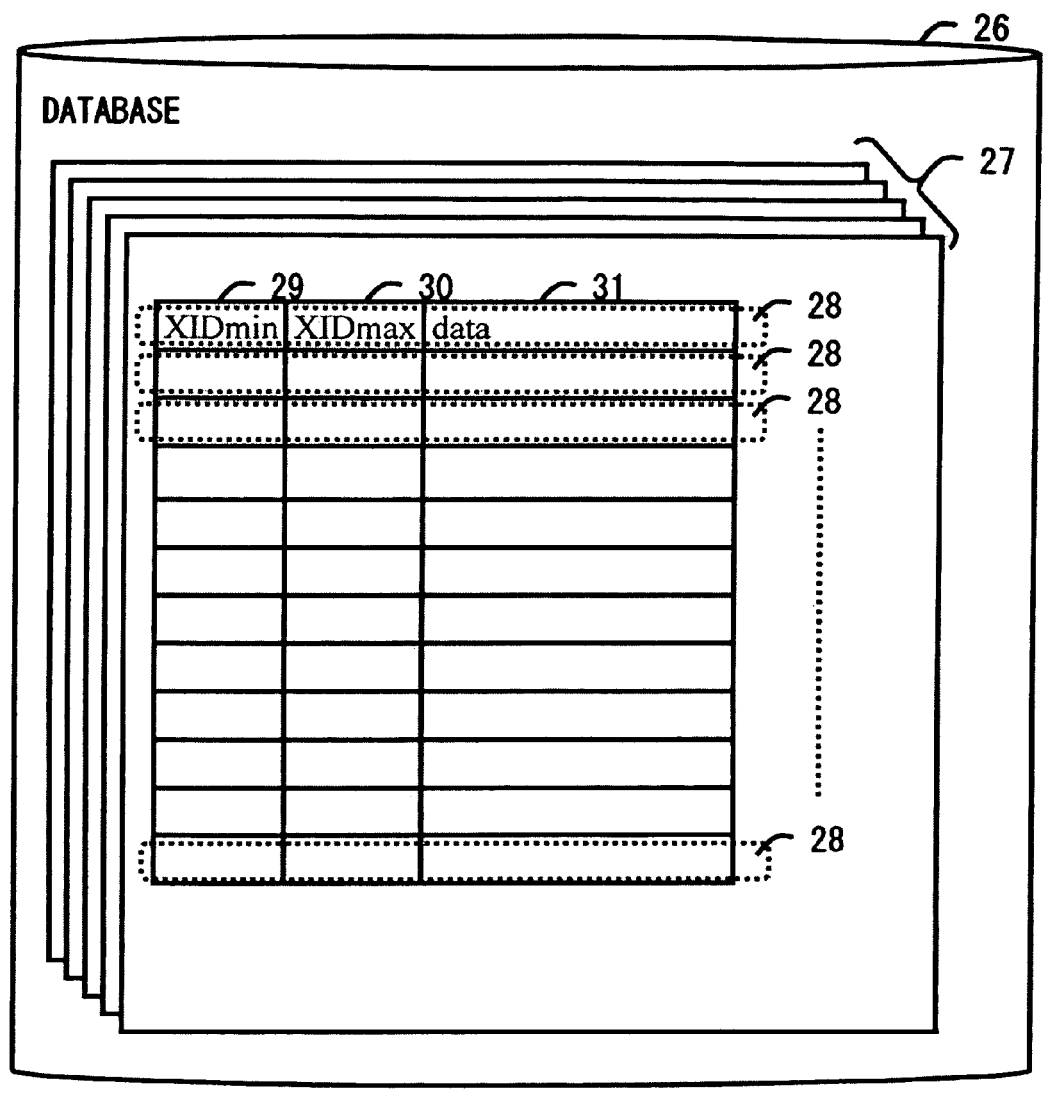
FIG. 2 illustrates the structure of a database 26 according to the present embodiment.

FIG. 2 illustrates the structure of the database 26 in accordance with the present embodiment. The database 26 has a plurality of tables 27. Each table 27 stores a plurality of records 28. Each table 27 includes three columns, i.e., a first column for a transaction ID (data XIDmin 29), a second column for a transaction ID (data XIDmax 30), and a third column for data 31 for each record 28. Data XIDmin 29 is registered when a transaction to insert a new record is executed. For example, when an INSERT command is executed, a new record 28 is written into a free space in the table and a transaction ID (data XIDmin 29) assigned to the INSERT command is registered in the first column for the written record. In addition, when an UPDATE command is executed, a record 28 obtained by updating is written into a free space in the table and a transaction ID (data XIDmin 29) assigned to the UPDATE command is registered in the first column for the written record. Data XIDmax 30 is registered when a transaction to delete a record is executed. For example, when a DELETE command is executed, a transaction ID (data XIDmax 30) assigned to the DELETE command is registered in the second column for the target record.

Figure 3:
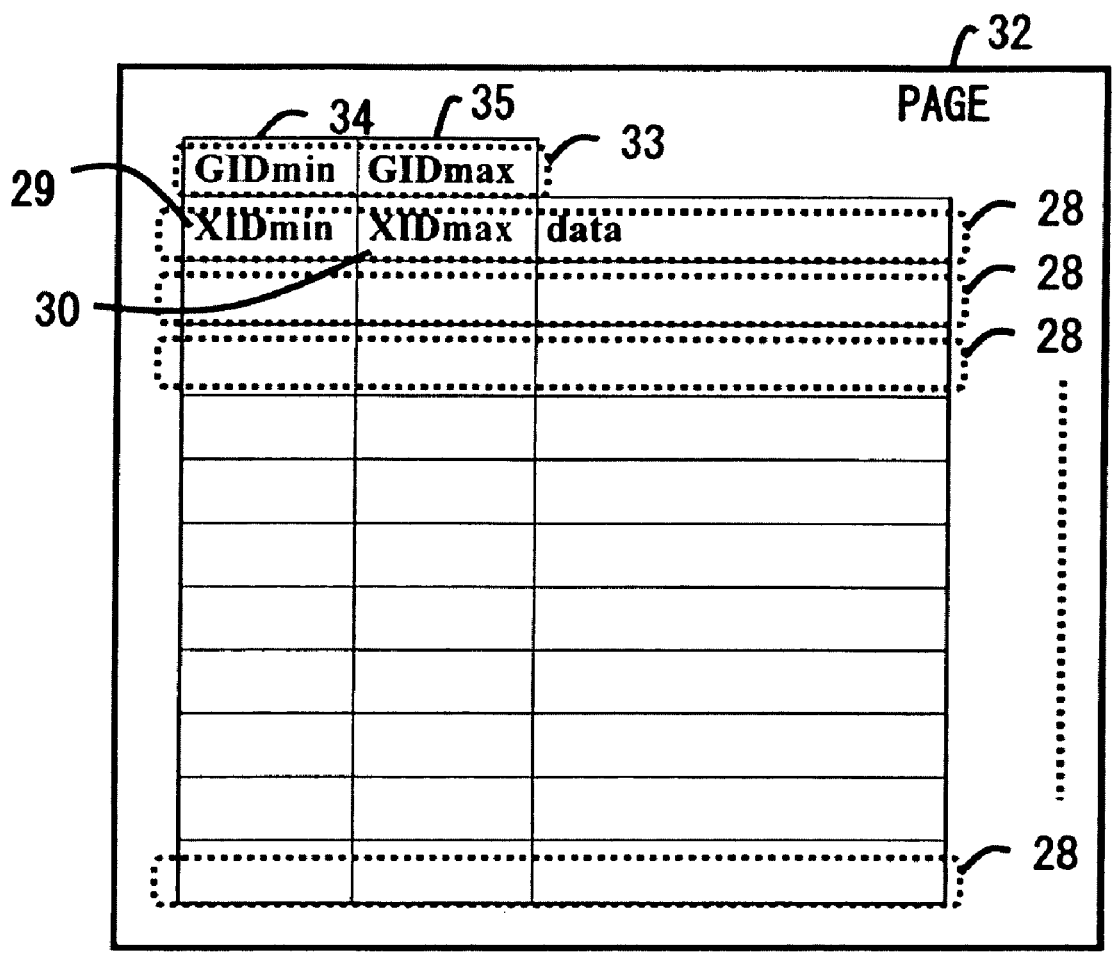
FIG. 3 is a diagram illustrating the composition of a page 32.

A page in the present embodiment will now be described. A page 32 is a unit of the amount of data read from the table 27 of the database 26 to the memory 22 by the control module 21. For example, one page has a size of 8 KB. FIG. 3 illustrates the composition of the page 32.

The page 32 contains a plurality of records 28. The page 32 has a page header 33. The page header 33 has a generation identification number (hereinafter, referred to as "GID"). A GID is a number used to identify the generation of an XID. As for the generation, the range of the values of XIDs is divided into a predetermined number of subranges and the generation (GID) changes each time a subrange is switched to the next subrange.

Figure 4:
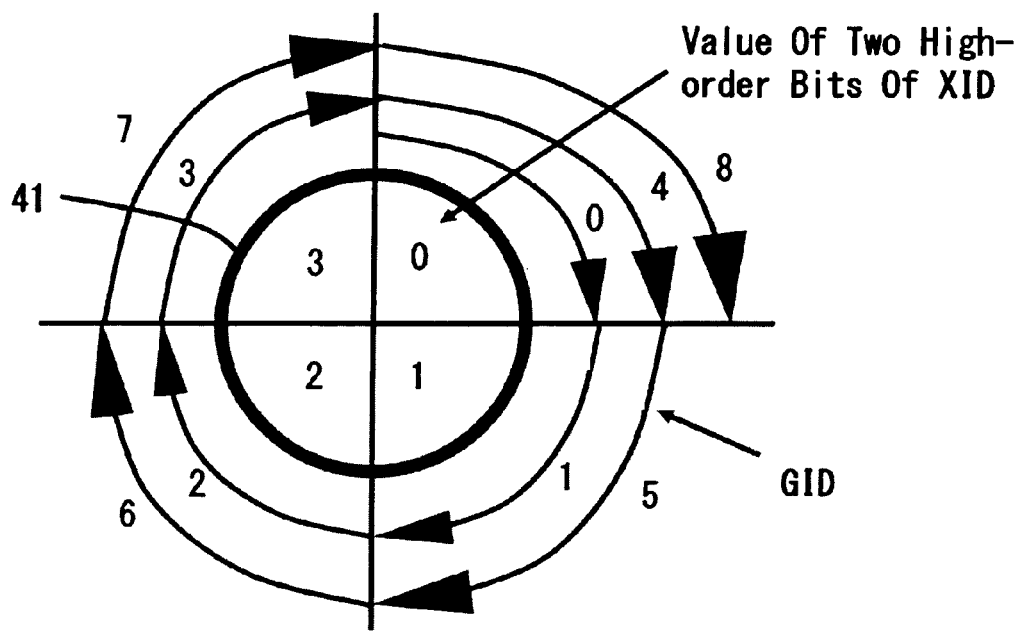
FIG. 4 is a diagram showing the relationship between XIDs and GIDs.

The relationship between XIDs and GIDs will now be described. FIG. 4 is a diagram illustrating the relationship between XIDs and GIDs. Referring to FIG. 4, a circle 41 denotes the range of the values of XIDs. In the present embodiment, it is assumed that each XID is a 32-bit integer. Therefore, the circle 41 may include $2^{32}$ XIDs.

The range of the values of XIDs is divided into a predetermined number of subranges and the generation (GID) changes each time a subrange is switched to the next subrange. Each GID is a number used to specify the generation. In the present embodiment, the range of the values of XIDs is divided into four subranges. Referring to FIG. 4, the circle 41 indicating the range of the values of XIDs is divided into four subranges (0, 1, 2, and 3).

In the present embodiment, it is assumed that the value of an XID increases by one each time a new identification number is acquired. Each XID has a value that is an integer up to the 32nd power of 2. Therefore, assuming that each XID is expressed as a binary number, all the values of XIDs can be divided into four groups on the basis of a change in two high-order bits. The value of a GID changes each time the value of an acquired XID exceeds the current subrange and the subrange is switched to the next subrange. Therefore, the value of a GID may be increased by one each time two high-order bits of an XID change. Referring to FIG. 4, the values in the circle 41 indicate the values of two high-order bits of XIDs. The values of two high-order bits of XIDs are expressed as "00", "01", "10", and "11" using binary numbers. The above-described relationship between XIDs and GIDs is illustrated by the table arranged in lower part of FIG. 4. Again referring to FIG. 3, the composition of the page 32 will be further described.

The page header 33 includes data GIDmin 34 and data GIDmax 35. For example, when the page 32 is initialized, a GID indicating the generation to which an XID assigned to a transaction currently in progress belongs is set as each of data GIDmin 34 and data GIDmax 35 in the page header 33. The data GIDmin 34 indicates the earliest (i.e., smallest) generation among the generations to which data blocks XIDmin 29 of records included in the page 32 belong. The data GIDmax 35 indicates the smallest generation among the generations to which data blocks XIDmax 30 of the records included in the page 32 belong.

In the present embodiment, the length of each XID is not simply extended. For example, assuming that each GID has a 32-bit length, when an XID is combined with a GID, the resultant data related to a transaction has a 64-bit length. In the database system, if a 64-bit length is set to the length of each XID, a transaction can be uniquely specified. However, since the capacity of a single page, serving as a unit of the amount of data read at a time, does not change, the amount of data readable at a time is reduced. This results in a reduction in data read speed of the database system. According to the present embodiment, a GID is assigned only to each page header. Advantageously, a reduction in the amount of data readable from the database 26 to the memory 22 can be prevented.

Database management will now be described. FIG. 5 is a flowchart of an operation of acquiring identification numbers, i.e., a transaction ID number and a generation ID number. As for the transaction ID number (XID), when a new XID is needed, the new XID is numbered. As for the generation ID number (GID), when XIDs assigned to one generation are finished, a new GID is numbered. The control module 21 receives a processing request to access a record in the database 26 in accordance with an application for executing a process of accessing the database 26. The control module 21 reads a page containing the record, serving as the target of the processing request, to the memory 22.

The control module 21 temporarily saves the current latest transaction ID (XID) (step S01). The current latest transaction ID (XID) is stored in, for example, the memory 22. Saving the current latest XID enables the control module 21 to use the current latest XID in an arithmetic operation for the subsequent processes.

The control module 21 generates a new XID to be assigned to the request to access the database 26 sent from the application (step S02). The newly generated XID is obtained by adding 1 to, for example, the XID in step S01.

The control module 21 determines whether the generation which the XID in step S01 belongs to is the same as that which the XID generated in step S02 belongs to (step S03). Specifically, the control module 21 determines whether a value indicating a subrange including the XID saved in step S01 agrees with a value indicating a subrange including the XID generated in step S02. In the present embodiment, the range of XIDs is divided into four subranges as described above with reference to FIG. 4. Accordingly, a value indicating a subrange including an XID corresponds to the value of two high-order bits of the XID. The control module 21 determines whether the values of two high-order bits of those XIDs agree with each other.

When the control module 21 determines that the generation which the XID in step S01 belongs to is not the same as that which the XID generated in step S02 belongs to (NO in step S03), the control module 21 generates a new GID (step S04). For example, the control module 21 adds 1 to the current latest GID to generate a new GID.

Figure 6:
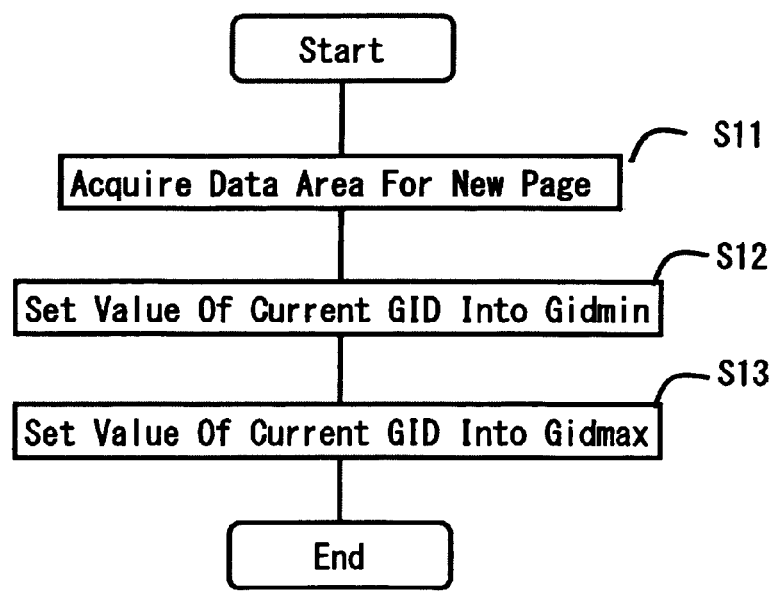
FIG. 6 is a flowchart of a page initializing operation of a control module 21.

An operation of initializing a page will now be described. FIG. 6 is a flowchart of the page initializing operation of the control module 21. The control module 21 acquires a data area for a new page 32 (step S11). The control module 21 updates data blocks GIDs in the page header 33 to data blocks GIDs indicating the generation, which the XID assigned to the current transaction belongs to. Specifically, the control module 21 sets the value of a GID indicating the generation, which the XID assigned to the current transaction belongs to, as data GIDmin 34 (step S12) and sets the value of the GID for the generation, which the XID assigned to the current transaction belongs to, as data GIDmax 35 (step S13).

Figure 7:
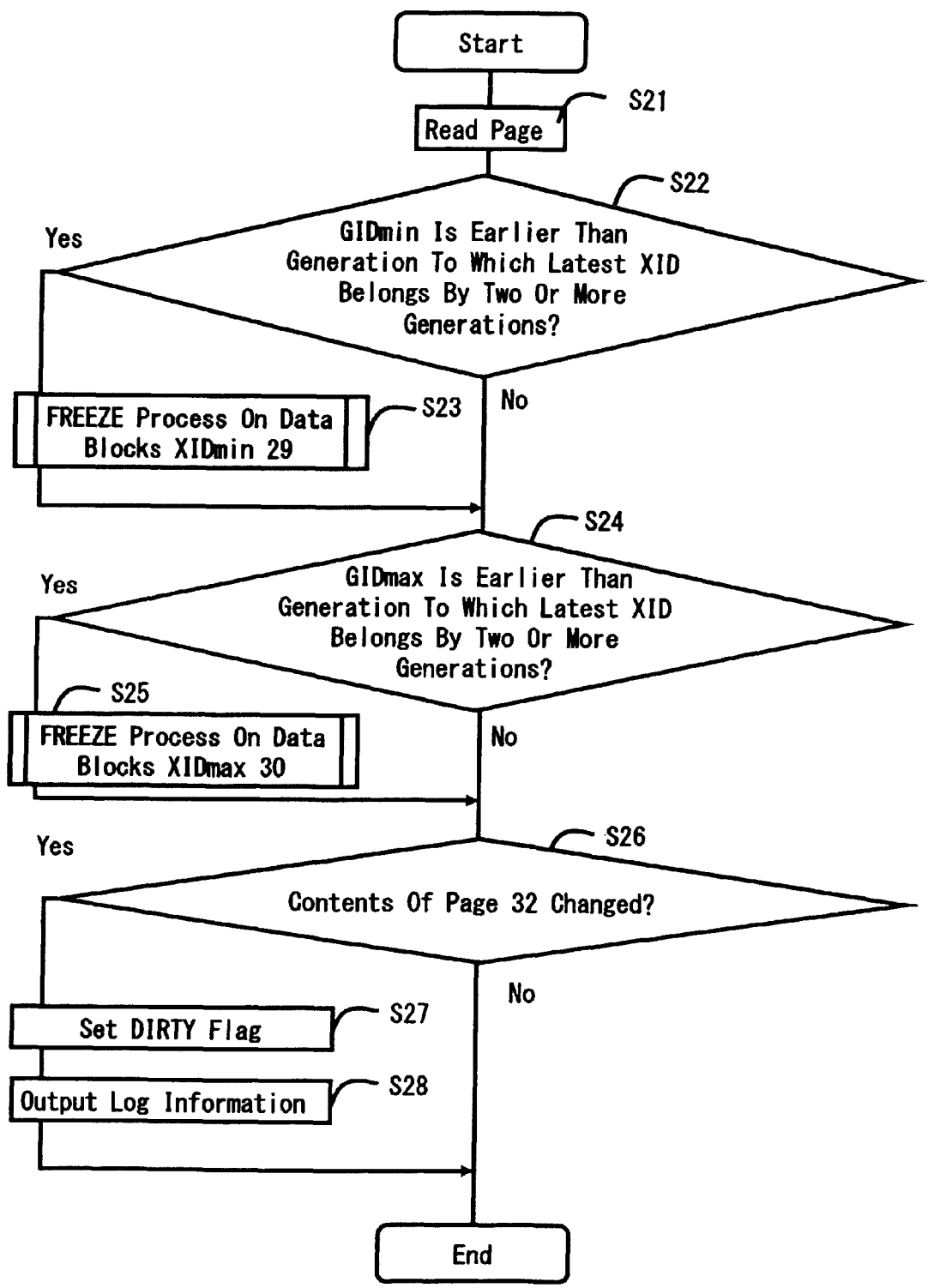
FIG. 7 is a flowchart of a page reading operation of the control module 21.

An operation of reading a page stored in the database 26 will now be described. FIG. 7 is a flowchart of the page reading operation of the control module 21. When reading a page, the control module 21 switches how to process the page in accordance with the value indicated by data GIDmin 34 and that indicated by data GIDmax 35 stored in the page header 33.

The control module 21 reads a target record 28 from the database 26 in accordance with a request from an application. In the present embodiment, the unit of data read from the table 27 by the control module 21 is a single page 32. Therefore, the control module 21 reads the page 32 containing the target record 28 (step S21).

The control module 21 determines whether the generation identified by the data GIDmin 34 is earlier than the generation to which the latest XID assigned to the transaction belongs by two or more generations (step S22). In the present embodiment, the difference between generations used to determine whether a target record is valid or invalid is set to "2" as a reference. Advantageously, setting the difference between generations for determining the validity of a target record to "2" enables the result of this operation to agree with the result of a record validity determining operation based on a known VACUUM process. The reason is that the known VACUUM process uses a method of dividing the range of XIDs into two subranges, i.e., a subrange for previous XIDs and a subrange for following XIDs on the basis of the latest XID as a reference.

When the generation identified by the data GIDmin 34 is earlier than the generation to which the latest XID belongs by two or more generations (YES in step S22), the control module 21 performs a FREEZE process on data blocks XIDmin 29 contained in the page 32 (step S23).

Figure 8A:
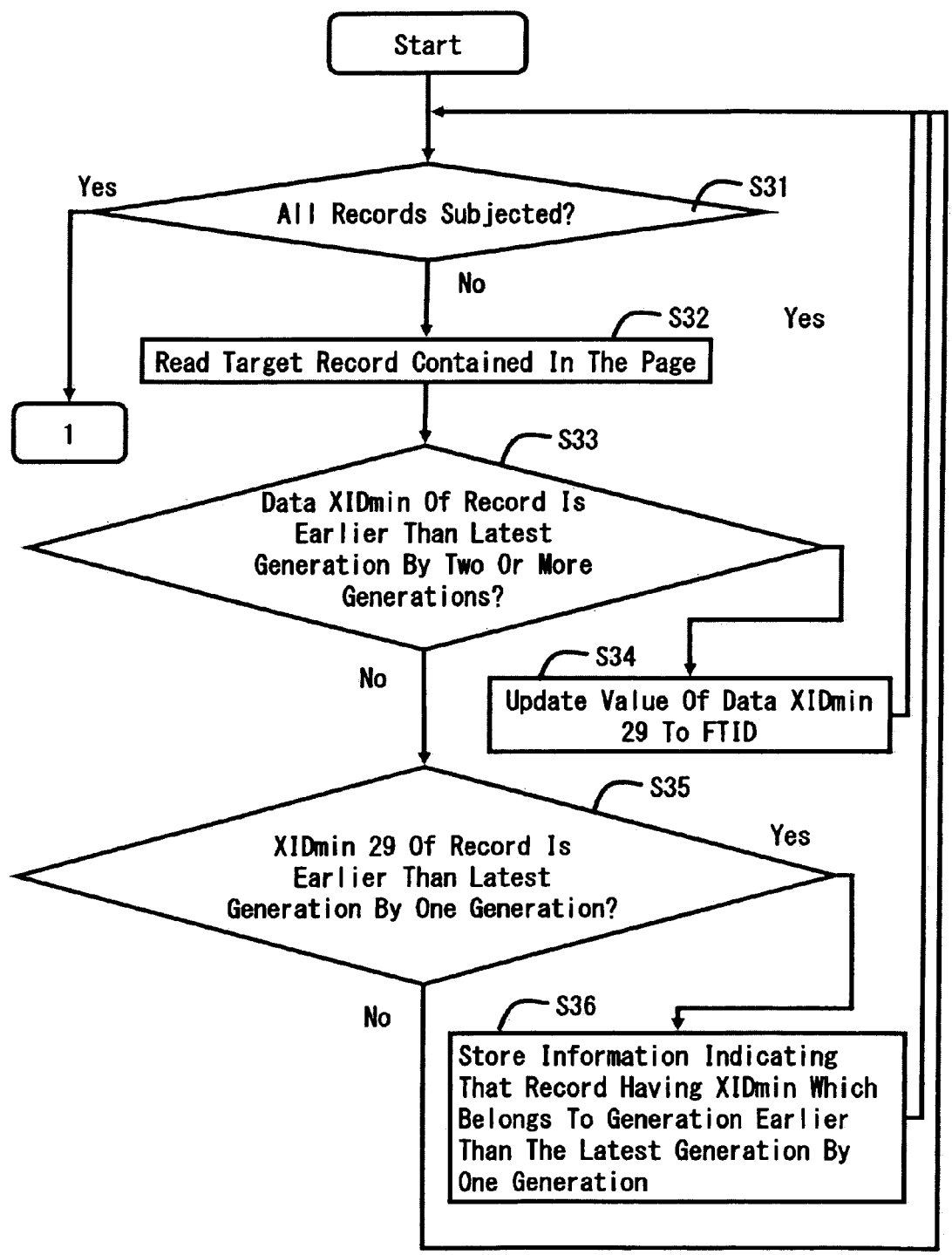

The FREEZE process performed on the data blocks XIDmin 29 contained in the page 32 by the control module 21 in step S23 will now be described in detail. FIG. 8A and FIG. 8B are flowcharts of the FREEZE process on the data blocks XIDmin 29.

The control module 21 determines whether all records 28 contained in the current page 32 have been subjected to step S32 and subsequent steps (step S31). When all of the records 28 contained in the current page 32 have not been subjected to step S32 and subsequent steps (NO in step S31), the control module 21 reads a target record 28 contained in the page 32 (step S32). The control module 21 determines(evaluates) whether the generation which the data XIDmin 29 of the record read in step S32 belongs to is earlier than the latest generation, identified by the latest generation ID number, by two or more generations (step S33).

When the generation which the data XIDmin 29 of the record read in step S32 belongs to is earlier than the latest generation by two or more generations (YES in step S33), the control module 21 updates(or invalids) the value of the data XIDmin 29 of the record read in step S32 to a value indicating that this XID is excluded from targets subjected to comparison between the values of transaction IDs (step S34). This value, which indicates exclusion from targets subjected to comparison between the values of transaction IDs, denotes a special XID ("Frozen Transaction Id" or "FTID") that is related to an enough old record and is determined to be older than other XIDs. In other words, the control module 21 executes the FREEZE process of replacing the XID with the special XID (FTID).

On the other hand, when the generation to which the data XIDmin 29 of the record read in step S32 belongs is not earlier than the latest generation by two or more generations (NO in step S33), the control module 21 determines whether the generation which the data XIDmin 29 of the record read in step S32 belongs to is earlier than the latest generation by one generation (step S35). When the generation which the data XIDmin 29 of the record read in step S32 belongs to is earlier than the latest generation by one generation (YES in step S35), the control module 21 stores information indicating that the page 32 contains the record having the data XIDmin 29 which belongs to the generation earlier than the latest generation by one generation (step S36). On the other hand, when the generation which the data XIDmin 29 of the record read in step S32 belongs to is not earlier than the latest generation by one generation (NO in step S35), the generation which the data XIDmin 29 of the record read in step S32 belong to is the same as the generation which the current latest XID belongs to. Accordingly, the control module 21 does not process this record. The processing routine is returned to step S31 and the next record is processed.

When processing all the records 28 contained in the page 32 is completed (YES in step S31), the control module 21 determines whether the page 32 contains a record 28 having the data XIDmin 29 which belongs to the generation earlier than the latest generation by one generation (step S37). Specifically, the control module 21 determines whether the information, indicating that the page 32 contains a record having the data XIDmin 29 which belongs to the generation earlier than the latest generation by one generation, has been stored in step S36. When the page 32 contains the record one generation ago (YES in step S37), the control module 21 stores a value, obtained by subtracting 1 from the value of the latest GID, as data GIDmin 34 (step S38). On the other hand, when the page 32 does not contain a record one generation ago (NO in step S37), the control module 21 stores the value of the latest GID as data GIDmin 34. Again referring to the flowchart of FIG. 7, the operation in FIG. 7 will be further described.

The control module 21 determines whether the generation identified by the data GIDmax 35 is earlier than the generation to which the latest XID assigned to the transaction belongs by two or more generations (step S24). In the present embodiment, the difference between generations used to determine whether a target record is valid or invalid is set to "2" as a reference. As described above, setting the difference between generations for determining the validity of a target record to "2" enables the result of this operation to agree with the result of a record validity determining operation in a known VACUUM process. The reason is that the known VACUUM process uses a method of dividing the range of XIDs into two subranges, i.e., a subrange for previous XIDs and a subrange for following XIDs on the basis of the current XID as a reference.

When data blocks XIDmax 30 are subjected to the FREEZE process, a record related to a completed process can be deleted from the page 32. A known VACUUM process includes a FREEZE process and a reclaiming process. In the present embodiment, the data blocks XIDmin 29 are subjected to the FREEZE process. The data blocks XIDmax 30 are subjected to the reclaiming process, thus providing a free space.

When the generation identified by the data GIDmax 35 is earlier than the generation to which the latest XID assigned to the transaction belongs by two or more generations (YES in step S24), the control module 21 performs a FREEZE process on the data blocks XIDmax 30 contained in the page 32 (step S25).

Figure 9A:
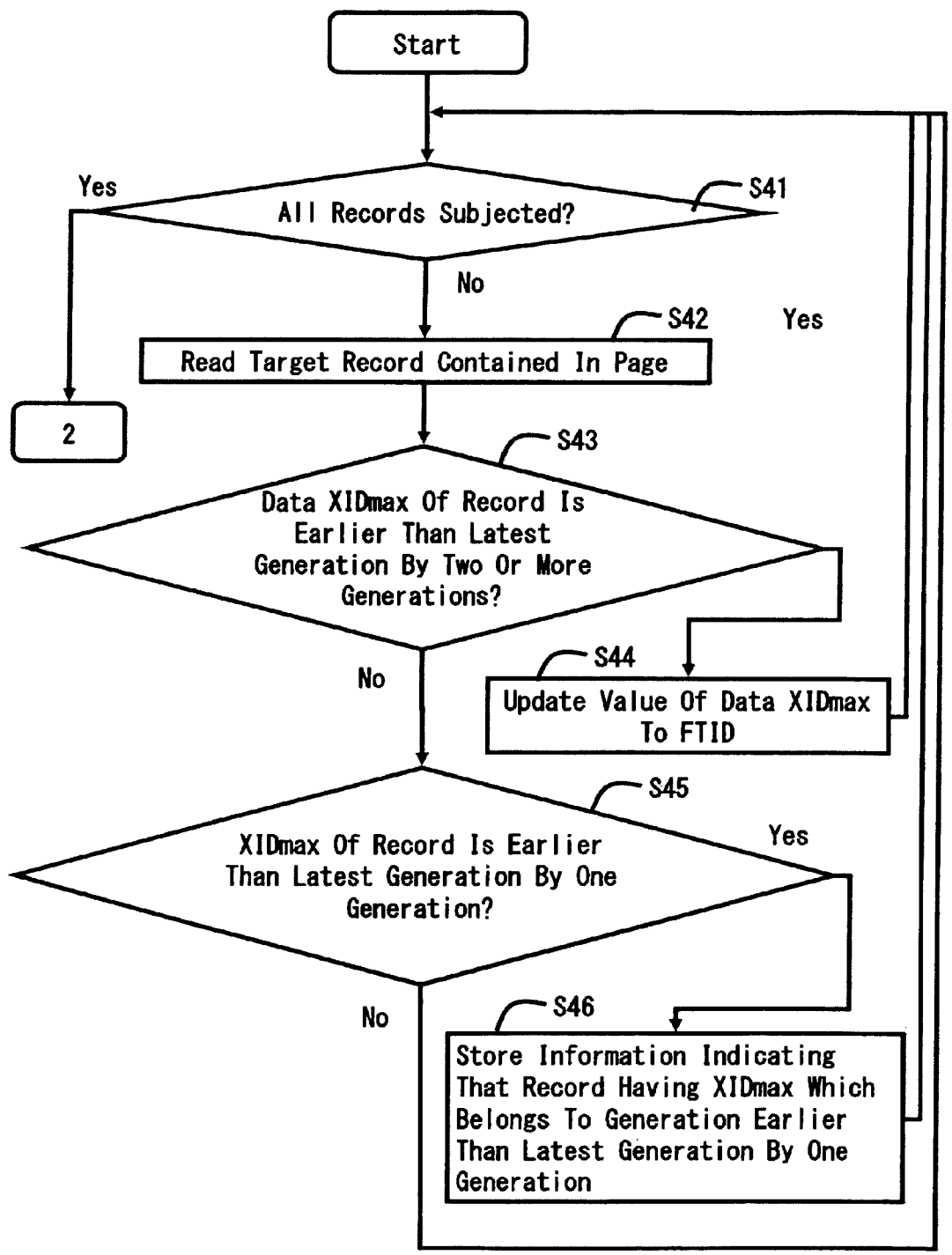
FIG. 9A and FIG. 9B are flowcharts of a FREEZE process performed on data XIDmax 30.
Figure 9B:
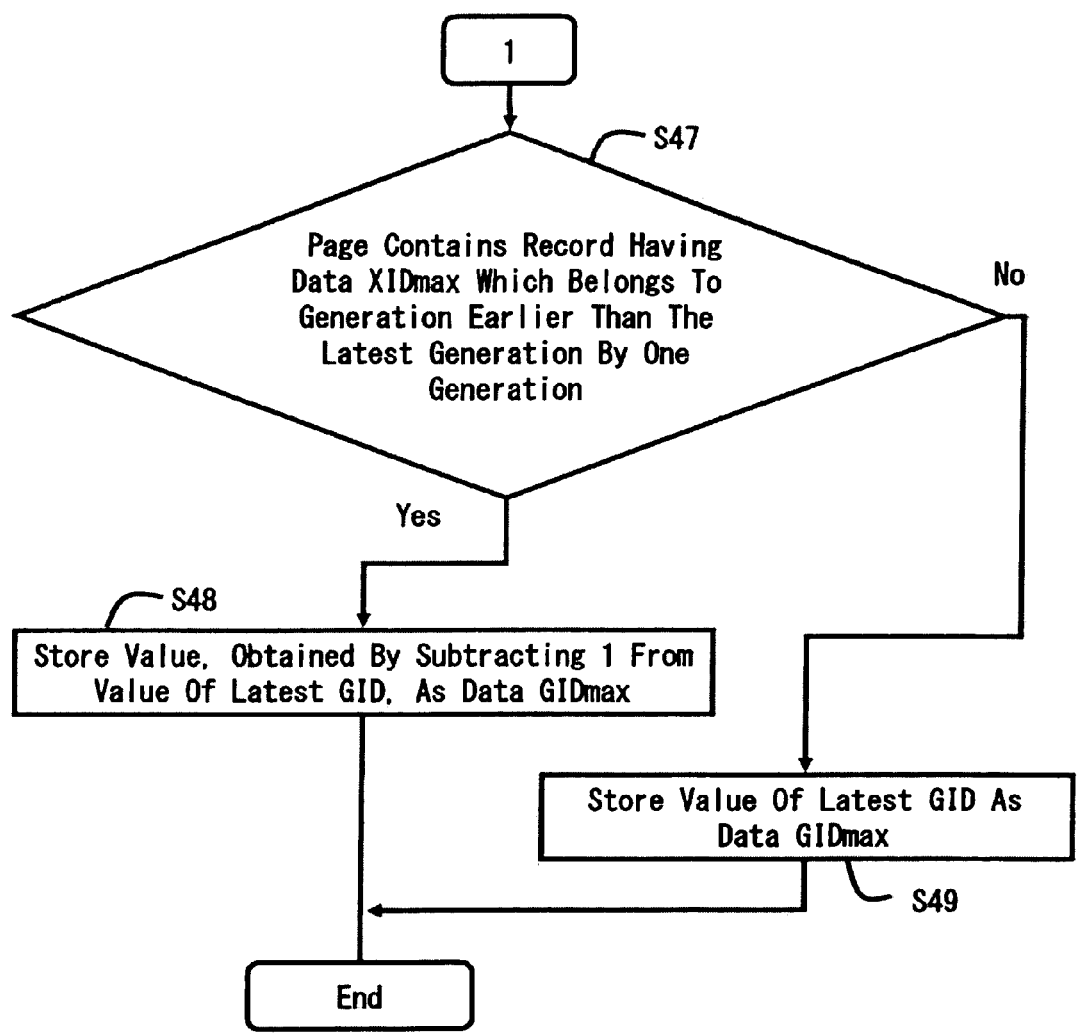

The FREEZE process performed on the data blocks XIDmax 30 contained in the page 32 by the control module 21 in step S25 will now be described in detail. FIG. 9A and FIG. 9B are flowcharts of the FREEZE process on the data blocks XIDmax 30.

The control module 21 determines whether all of the records 28 contained in the current page 32 have been subjected to step S42 and subsequent steps (step S41). When all the records 28 contained in the current page 32 have not been subjected to step S42 and subsequent steps (NO in step S41), the control module 21 reads a target record 28 contained in the page 32 (step S42). The control module 21 determines whether the generation which the data XIDmax 30 of the record read in step S42 belongs to is earlier than the latest generation by two or more generations (step S43).

When the generation which the data XIDmax 30 of the record read in step S42 belongs to is earlier than the latest generation by two or more generations (YES in step S43), the control module 21 updates the value of the data XIDmax 30 of the record read in step S42 to a value indicating that this XID is excluded from targets subjected to comparison between the values of transaction IDs (step S44). This value, which indicates exclusion from targets subjected to comparison between the values of transaction IDs, denotes a special XID ("Frozen Transaction Id" or "FTID") that is assigned to an enough old record and is determined to be older than other XIDs. In other words, the control module 21 executes the FREEZE process of replacing the XID with the special XID (FTID).

On the other hand, when the generation which the data XIDmax 30 of the record read in step S42 belongs to is not earlier than the latest generation by two or more generations (NO in step S43), the control module 21 determines whether the generation which the data XIDmax 30 of the record read in step S42 belongs to is earlier than the latest generation by one generation (step S45). When the generation which the data XIDmax 30 of the record read in step S42 belongs to is earlier than the latest generation by one generation (YES in step S45), the control module 21 stores information indicating that the page 32 contains the record having the data XIDmax 30 which belongs to the generation earlier than the latest generation by one generation (step S46). On the other hand, when the generation which the data XIDmax 30 of the record read in step S42 belongs to is not earlier than the latest generation by one generation (NO in step S45), the generation which the data XIDmax 30 of the record read in step S42 belongs to is the same as the generation which the current latest XID belongs to. Accordingly, the control module 21 does not process this record. The processing routine is returned to step S41 and the next record is processed.

When processing all the records 28 contained in the page 32 is completed (YES in step S41), the control module 21 determines whether the page 32 contains a record 28 having the XIDmax 30 which belongs to the generation earlier than the latest generation by one generation (step S47). Specifically, the control module 21 determines whether the information, indicating that the page 32 contains a record having the data XIDmax 30 which belongs to the generation earlier than the latest generation by one generation, has been stored in step S46. When the page 32 contains the record one generation ago (YES in step S47), the control module 21 stores a value, obtained by subtracting 1 from the value of the latest GID, as data GIDmax 35 (step S48). On the other hand, when the page 32 does not contain a record one generation ago (NO in step S47), the control module 21 stores the value of the latest GID as data GIDmax 35. Again referring to the flowchart of FIG. 7, the operation in FIG. 7 will be further described.

The control module 21 determines whether the contents of the page 32 have been changed (step S26). If the contents of the page 32 have been changed (YES in step S26), the control module 21 sets a DIRTY flag, which is to be set when the memory 22 stores DIRTY data to be reflected in the database 26. Although the DIRTY data should be reflected in the database 26, the DIRTY data exists only in the memory 22. For example, when a new record is added to the page 32, the control module 21 has to reflect the updated page 32 in the database 26. Therefore, the control module 21 stores the DIRTY data, serving as the updated page 32 to be reflected in the database 26, to the memory 22. The control module 21 outputs log information. The log information indicates, for example, a change in the contents of the page 32.

Figure 10:
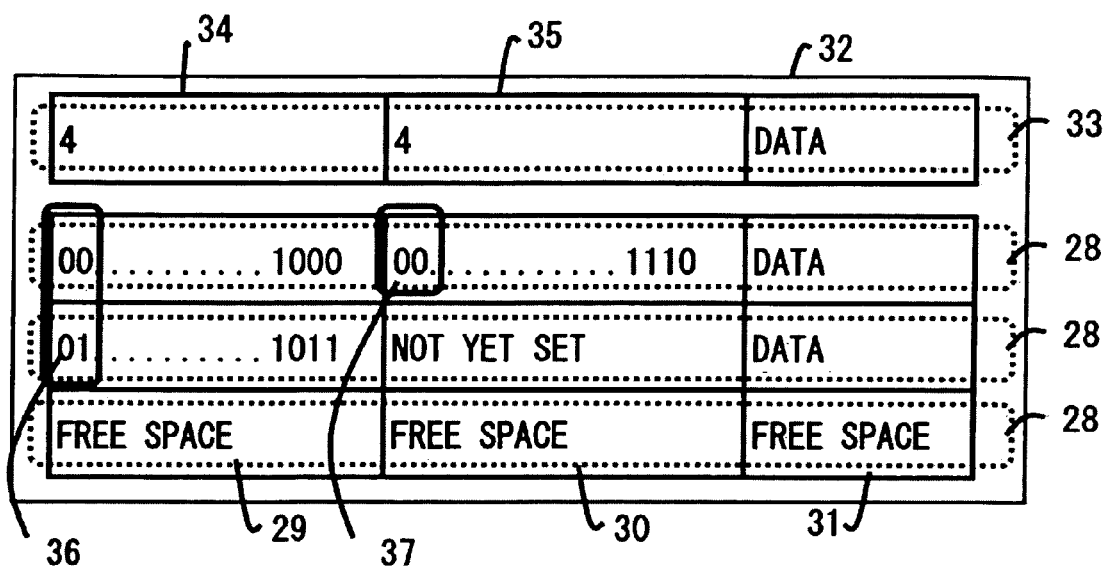
FIG. 10 illustrates the composition of a page 32 read from the database 26.
Figure 11:
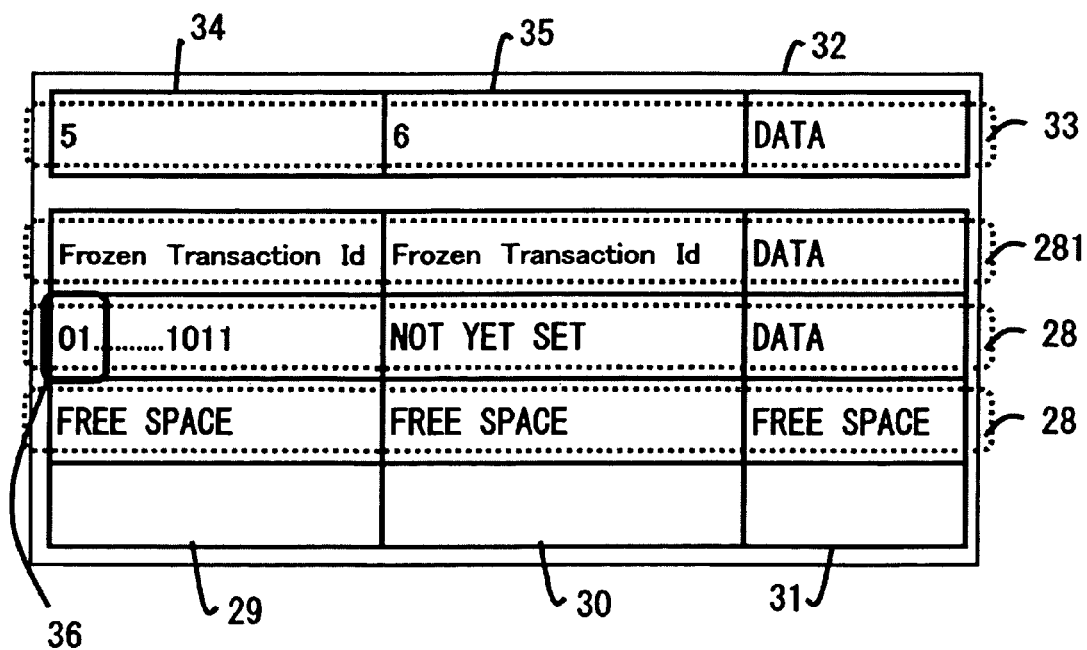
FIG. 11 illustrates the composition of the page 32 that has been subjected to the FREEZE processes by the control module 21.

A concrete example of a change in the contents of a page 32 to which the present embodiment is applied in accordance with the flowcharts of FIGS. 7 to 9 will now be described. FIG. 10 shows the composition of the page 32 read from the database 26. FIG. 11 shows the composition of the page 32 subjected to FREEZE processes by the control module 21.

Referring to FIG. 10, the page 32 has a page header 33 and a plurality of records 28. The page header 33 contains data GIDmin 34, data GIDmax 35, and another data. Each record 28 contains data XIDmin 29, data XIDmax 30, and data 31 such that the data XIDmin 29 is arranged in a first column, the data XIDmax 30 is arranged in a second column, and the data 31 is arranged in a third column.

In the page 32, the first column includes binary numbers of "00 . . . 1000" and "01 . . . 1011", serving as the values of the data blocks XIDmin 29 of the respective records, and a free space. The second column includes a binary number of "00 . . . 1110", serving as the value of the data XIDmax 30 of the record, information indicating "not yet set", and a free space. The third column includes the data blocks 31 to be managed in the database and a free space.

The data GIDmin 34 indicates a minimum value of generation ID numbers obtained from the data blocks XIDmin 29 of the respective records 28 in the page 32. Each generation ID number corresponds to a value of two high-order bits 36 obtained by expressing data XIDmin 29 as a binary number. Each time two high-order bits 36 change, a generation ID number increases by one. Referring to FIG. 10, the data XIDmin 29, expressed as "00 . . . 1000", has a value of "00" corresponding to two high-order bits 36. The data XIDmin 29, expressed as "01 . . . 1011", has a value of "01" corresponding to two high-order bits 36. On the basis of the relationship shown in FIG. 4, when the value of the two high-order bits 36 is "00", a generation ID number of "4" is assigned to this case. When the value of the two high-order bits 36 is "01", a generation ID number of "5" is assigned to this case. Therefore, the generation ID number of "4" is stored as the data GIDmin 34.

The data GIDmax 35 indicates a minimum value of generation ID numbers obtained from the data blocks XIDmax 30 of the respective records 28 contained in the page 32. Each generation ID number corresponds to a value of two high-order bits 37 obtained by expressing data XIDmax 30 as a binary number. Each time two high-order bits 37 change, a generation ID number increases by one. Referring to FIG. 10, the data XIDmax 30, expressed as "00 . . . 1110", has a value of "00" corresponding to two high-order bits 37. Referring to the relationship shown in FIG. 4, since the value of the two high-order bits 36 is "00", a generation ID number of "4" is assigned to this case. Therefore, the generation ID number of "4" is stored as the data GIDmax 35.

A FREEZE process executed by the control module 21 when the current latest generation ID number is "6" and the page 32 in FIG. 10 is read will now be described.

The control module 21 compares the value "6" of the latest generation ID number with the value "4" indicated by the data GIDmin 34 in the page 32 shown in FIG. 10. On the basis of the comparison, the control module 21 can determine whether the page 32 contains a record having an XID which belongs to the generation earlier than the latest generation identified by the latest generation ID number by a predetermined value (difference) or more. In the present embodiment, the control module 21 executes the FREEZE process when the difference is two or more. In this case, therefore, the data blocks XIDmin 29 stored in the page 32 include the XID which belongs to the generation earlier than the latest generation by two or more generations.

Among the data blocks XIDmin 29 of the records 28, the control module 21 updates the data XIDmin 29, which includes a value indicating the generation earlier than the latest generation by two or more generations, to "Frozen Transaction Id".

The value of the two high-order bits 36 of the data XIDmin 29 corresponding to the value "4" of the data GIDmin 34 is "00" according to the relationship in FIG. 4. Therefore, the control module 21 updates the data XIDmin 29, expressed as "00 . . . 1000", of the record 28 in which the value of the two high-order bits 36 is "00" to "Frozen Transaction Id", which is shown as data XIDmin 29 of a record 281 in FIG. 11.

Further, the control module 21 detects data XIDmin 29 having two high-order bits indicating the generation earlier than the latest generation by one generation in the page 32. Referring to FIG. 10, the control module 21 detects the data XIDmin 29 related to the generation ID number "5" earlier than the latest generation ID number "6" by one. Specifically, the control module 21 detects "01", serving as the two high-order bits of "01 . . . 1011" and corresponding to the generation ID number "5" in FIG. 4. The control module 21 updates the data GIDmin 34 in the page header 33 in FIG. 10 such that the data indicates the generation ID number "5" that is earlier than the latest generation ID number by one, as shown in FIG. 11.

In addition, the control module 21 compares the value "6" of the latest generation ID number with the value "4" indicated by the data GIDmax 35 in the page 32 in FIG. 10. On the basis of the comparison, the control module 21 can determine whether the page 32 contains a record having an XID which belongs to the generation earlier than the latest generation, identified by the latest generation ID number, by a predetermined value (difference) or more. In the present embodiment, the control module 21 executes the FREEZE process when the difference is two or more. Since the data XIDmax 30 stored in the page 32 is related to the generation earlier than the latest generation by two or more generations, the control module 21 executes the FREEZE process. The control module 21 updates the data XIDmax 30, which includes a value indicating the generation earlier than the current generation by two or more generations, to "Frozen Transaction Id". The control module 21 may perform a process of reclaiming the record 28 having a value indicating the generation earlier than the latest generation by two or more generations. However, the reclaiming process requires long time, resulting in a load on a process of reading a record 28 from the database 26. Accordingly, the reclaiming process is not performed in the present embodiment.

The value of the two high-order bits 37 of the data XIDmax 30 corresponding to the value "4" of the data GIDmax 35 is "00" in accordance with the relationship in FIG. 4. Therefore, the control module 21 updates the data XIDmax 30, expressed as "00 . . . 1110", of the record 28 in which the value of the two high-order bits 37 is "00" to "Frozen Transaction Id", which is shown as data XIDmax 30 of the record 281 in FIG. 11.

Further, the control module 21 detects data XIDmax 30 having two high-order bits indicating the generation earlier than the latest generation by one generation in the page 32. Referring to FIG. 10, although the control module 21 tries to detect data XIDmax 30 having a value corresponding to the generation ID number "5" earlier than the current generation ID number "6" by one generation, the control module 21 does not detect any relevant data. Accordingly, the control module 21 updates the data GIDmax 35 in the page header 33 in FIG. 10 such that the data indicates the generation ID number "6" corresponding to the current generation ID number, as shown in FIG. 11.

When reading the page 32, the control module 21 determines whether the generation indicated by each of the data blocks GID in the page header 33 is earlier than the latest generation by two or more generations. Accordingly, each page does not include XIDs in different turns. In other words, it is ensured that each of the generations related to data blocks XIDmin 29 of respective records contained in each page 32 corresponds to the value indicated by data GIDmin 34 or a value obtained by adding 1 to the value indicated by the data GIDmin 34. Further, it is ensured that each of the generations related to data blocks XIDmax 30 of respective records contained in each page 32 corresponds to the value indicated by data GIDmax 35 or a value obtained by adding 1 to the value indicated by the data GIDmax 35.

According to the above-described operation, when a certain page 32 is read from the database 26 and records 28 contained in the page 32 are actually processed, data XIDmin 29 and data XIDmax 30 of each record in the page 32 have similar states as those obtained by performing the FREEZE processes based on a known VACUUM command. Therefore, even if a new turn for XIDs is generated, the control module 21 can compare the values of XIDs.

As described above, according to the present embodiment, each time a page 32 is read from the database 26, an old record among records 28 contained in the page 32 can be subjected to a FREEZE process. Consequently, the periodic VACUUM process, which is performed in order to prevent the overflow of XIDs, is not needed. Thus, the serviceability of database management can be improved. In addition, a load caused by the VACUUM process on the database system is distributed, thus preventing a reduction-in performance of a business application using the database during the VACUUM process. Advantageously, since the periodic VACUUM process for preventing the overflow of transaction IDs is not needed, the serviceability of the database system can be improved.

In the present embodiment, the four subranges obtained by dividing the range of XIDs are set to generation groups. As for the values for specifying a generation used to determine the validity of a record, other values may be used. For example, a generation may be obtained using n high-order bits of the value of an XID. Alternatively, a generation may be determined irrespective of n (n is a natural number) high-order bits.

Accordingly, it is desirable to provide a database management apparatus and method for distributing a load caused by organization of transaction IDs in a database.

According to an embodiment of the present embodiment, there is provided a database management method of reading or writing a record from/to a database in accordance with a transaction and generating a new record for each operation in which the value of data in a record stored in the database is changed, the method including the steps of relating a transaction identification number to a record read or written in accordance with a transaction, performing the reading or writing operation on a predetermined amount of data containing a target record in the database, and when the difference between the transaction identification number related to the reading or writing operation and that related to a record contained in read data is equal to or higher than a predetermined value, excluding the record from target records to be subjected to determination for record ordering.

According to this embodiment, an unnecessary transaction identification number (ID) is deleted every page, serving as a data unit for reading a record. Accordingly, a load caused by a process of organizing transaction IDs in the database can be distributed. Advantageously, a reduction in processing speed of a database system caused when executing a VACUUM command can be prevented.

What is claimed is:

1. A method for managing a database for storing data, the method comprising:

obtaining a request of update of a record stored in the database, the database including a plurality of pages including a plurality of records, each of the records including data and transaction identification information (XID) for identifying an order of a transaction related to the data stored in the record, the XID having a range, the range of the value of the XID being divided by a predetermined range, the database including generation identification information (GID), the value of which is increased when the value of the XID exceeds the divided range, the order of the transaction being determined from the XID and the GID, the page being a unit of the amount of data read from the database, the page including a GID header for indicating the earliest GID among the records included in the page;

reading out a GID header of a page when the page is switched to another;

comparing the GID header with the present GID to which the present XID belongs; and performing a freeze process to the record having the XID included in the GID header in the page when the value of the GID header is smaller than a value calculated from a difference between a value of the GID to which the present XID belongs and a predetermined value.

2. The method according to claim 1, further comprising, determining said predetermined number on the basis of a range of the values of said information.

3. An apparatus for managing a database for storing data, the apparatus comprising:

an obtaining module for obtaining a request of update of a record stored in the database, the database including a plurality of pages including a plurality of records, each of the records including data and transaction identification information (XID) for identifying an order of a transaction related to the data stored in the record, the XID having a range, the range of the value of the XID being divided by a predetermined range, the database including generation identification information (GID), the value of which is increased when the value of the XID exceeds the divided range, the order of the transaction being determined from the XID and the GID, the page being a unit of the amount of data read from the database, the page including a GID header for indicating the earliest GID among the records included in the page;

a reading module for reading out a GID header of a page when the page is switched to another;

a comparing module for comparing the GID header with the present GID to which the present XID belongs; and a freezing module for performing a freeze process to the record having the XID included in the GID header in the page when the value of the GID header is smaller than a value calculated from a difference between a value of the GID to which the present XID belongs and a predetermined value.

4. A computer readable medium storing a program, the program managing a database by causing a computer to perform a process comprising:

obtaining a request of update of a record stored in the database, the database including a plurality of pages including a plurality of records, each of the records including data and transaction identification information (XID) for identifying an order of a transaction related to the data stored in the record, the XID having a range, the range of the value of the XID being divided by a predetermined range, the database including generation identification information (GID), the value of which is increased when the value of the XID exceeds the divided range, the order of the transaction being determined from the XID and the GID, the page being a unit of the amount of data read from the database, the page including a GID header for indicating the earliest GID among the records included in the page;

reading out a GID header of a page when the page is switched to another;

comparing the GID header with the present GID to which the present XID belongs;

performing a freeze process to the record having the XID included in the GID header in the page when the value of the GID header is smaller than a value calculated from a difference between a value of the GID to which the present XID belongs and a predetermined value.

5. The method according to claim 1, wherein the value of the GID is increased by increasing of each time predetermined high order bits of the XID change.

6. The method according to claim 1, further comprising, updating the value of the GID header of the page into the value of the GID to which the present XID belongs upon initializing the page.

7. The method according to claim 1, wherein the GID header has a minimum value indicating the smallest generation among the GID to which data records included in the page belongs, and wherein the freeze process is performed when the minimum value of the GID header is smaller than a value calculated from a difference between a value of the GID to which the present XID belongs and a predetermined value.

* * * * *